Dec. 22, 1970  B. R. SNOOK  3,548,571
ROTARY MOWERS
Filed Feb. 28, 1968  2 Sheets-Sheet 2
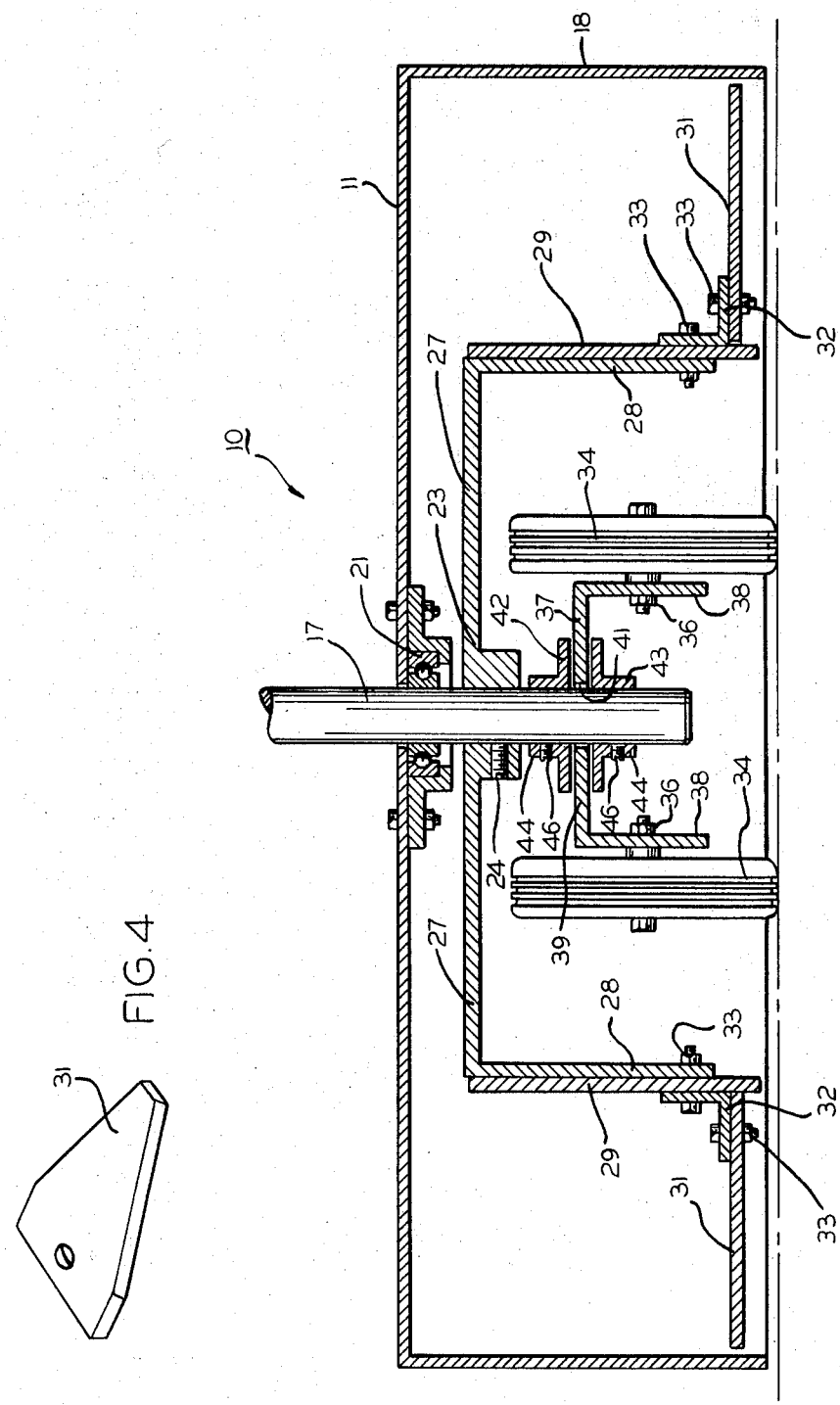
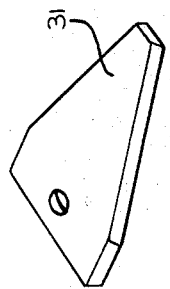
INVENTOR
BROOKSY RAY SNOOK
BY *Richard C. Lindberg*
ATTORNEY United States Patent Office 3,548,571
Patented Dec. 22, 1970

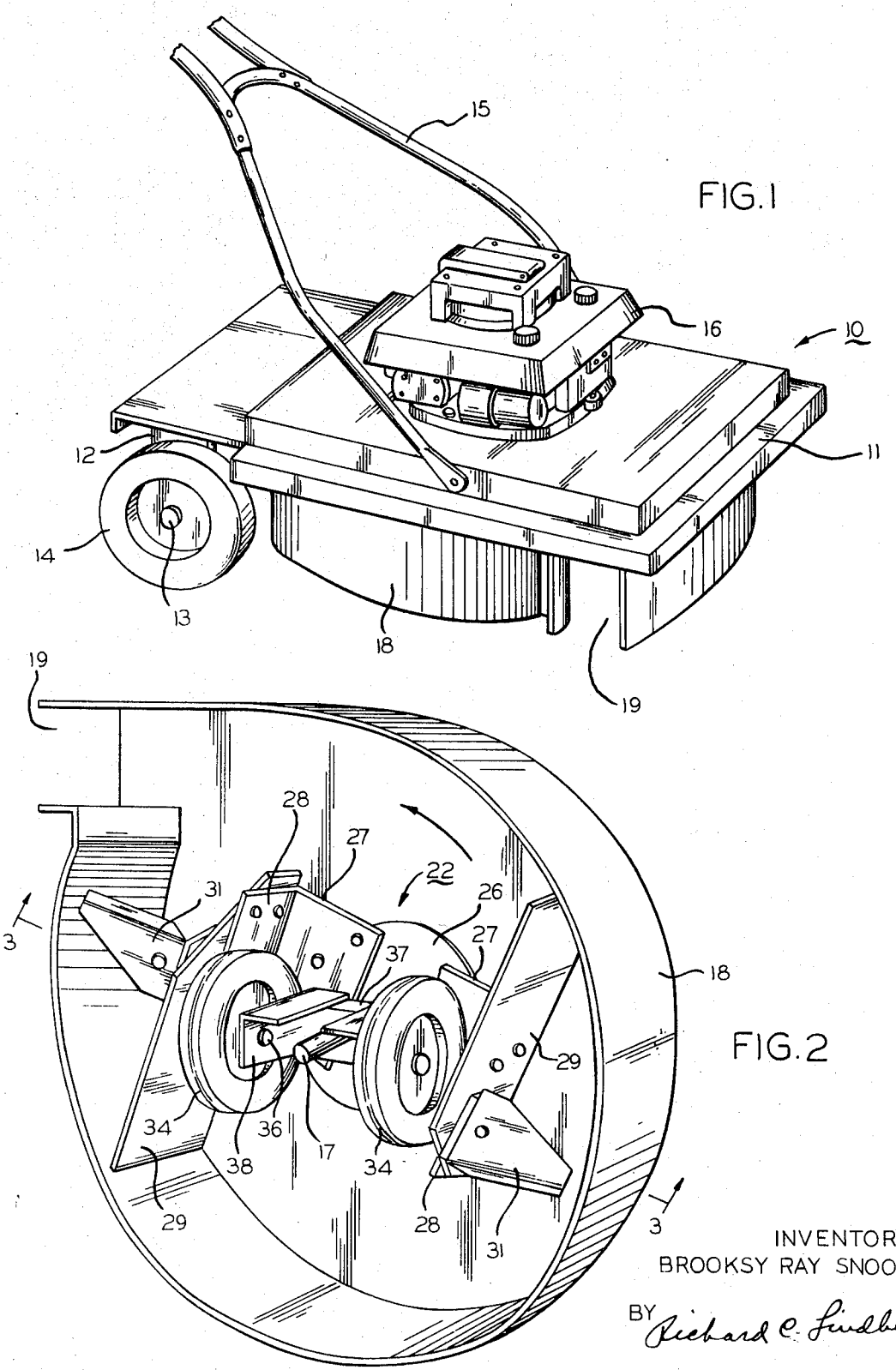

3,548,571
ROTARY MOWERS
Brooksy Ray Snook, 907 N. State St.,
Westville, Ill. 61832
Filed Feb. 28, 1968, Ser. No. 708,972
Int. Cl. A01d 35/26
U.S. Cl. 56—25.4                                1 Claim

ABSTRACT OF THE DISCLOSURE

A rotary motor characterized by a frame having support wheels secured thereto, and a rotary blade shroud enclosing a blade rotor, with at least one ground engaging wheel supported on a swivelable frame having a turning center corresponding to the turning center for the blade rotor whereby the blades of the rotor can cut closely to shrubs and trees, obstructions, lawn edges or the like, and whereby the mower can turn readily in any direction. The rotor is also characterized by additional arms providing a certain suction effect picking up litter in the grass and effectively straightening out the grass blades for efficient cutting.

---

The conventional rotary type (as contrasted to reel-type) lawn mowers are generally characterized by front and rear laterally spaced ground engaging wheels fixed in position to corners of a frame or shroud. Such mowers are more often powered by internal combustion engines having a vertical output shaft with the rotor fixed to the shaft within the shroud. The ground engaging wheels, being fixed to the frame, and extending outward therefrom, prevent the mower from operating close to trees, shrubs or other obstructions. Also, by reason of the fact that the wheels are fixed to the frame, the mower cannot be turned readily. Generally to effect turning, the frame must be rocked about its rear wheels, and then turned while the mower blades are out of contact with the grass.

The mower according to the present invention, on the other hand, is provided with a pair of fixed wheels at one end of the rotor shroud, at least one other supporting wheel being mounted on a frame freely swivelable on the vertical power shaft for the blade rotor. The aforesaid mower is also provided with rotor arms giving a certan suction effect to lift up litter between the grass blades, and to straighten the grass blades for efficient removal of such litter and cutting of the grass blades.

With the foregoing considerations in mind it is a principal object of this invention to provide an improved rotary type mower characterized by ease of turning, mowing closely to trees, shrubs and other obstructions in the grass area, and for effectively raising up and removing litter embedded in the grass as well as erecting the grass blades for effective cutting.

In the drawings:
FIG. 1 is a perspective view of a rotary mower having the improvements according to the present invention embodied therein;
FIG. 2 is a bottom view showing details of a shroud for the rotor blades and a pair of support wheels mounted to swivel on a center corresponding to the center of rotation of the rotor blades;
FIG. 3 is a section taken substantially along the plane indicated by the arrows 3—3 of FIG. 2 to an enlarged scale; and
FIG. 4 is a detail perspective of one of the rotor blades.

Referring now to FIG. 1 of the drawings, the improved rotary mower according to the present invention is denoted by the reference numeral 10, and consists of an essentially rectangular shaped frame 11 having dependent brackets 12 depending from the rear thereof. Each of the brackets 12 has a stub axle 13 extending laterally thereof, and a ground engaging wheel 14 is secured for rotation on each of the stub axles 13.

Frame 11 supports a conventional internal combustion engine 16 of a type well known in the art, it having a vertical power shaft 17 extending downward into a shroud 18 as seen in FIG. 2. Shroud 18 is secured to the underside of frame 11 in any convenient fashion. The shroud 18 is generally in the form of an involute having a cuttings discharge opening 19 at the front right corner of frame 11 and below the same. A steering handle 15 connected to the frame 11 enables the mower to be steered at will.

As seen in FIG. 3, frame 11 supports a bearing 21 for the shaft 17 which supports a blade rotor 22. A hub 23 on the blade rotor 22 receives a set screw 24 for making rotor 22 fast to shaft 17.

The blade rotor 22 is constructed and arranged so as to give a good draft or suction to the grass being cut, the blades of grass being substantially erected to facilitate the cutting operation.

Blade rotor 22 consists of a central disc 26 integral with the hub 23, and supports diametrically disposed bracket arms 27 having downward extensions 28. Impeller blades 29 are secured to the extensions 28 and operate to place suction on the grass and discharge the cut grass at the discharge opening 19.

The extensions 28 and impeller blades 29 also support cutting elements 31 which are held thereto by small angle members 32 and securing members 33.

Structure is provided for maintaining the blade rotor 22 in proper spaced relationship to the ground to achieve proper cutting of the grass, and to permit free turning of the mower 10 as described.

To this end a pair of spaced ground engaging wheels 34 are supported for swiveling movement on the power shaft 17, and between the extensions 28 of the rotor 22. Ground engaging wheels 34 are each mounted on a stub axle 36 secured to a carrier 37 having downward extensions 38 to which each stub axle 36 is secured. As seen in FIG. 3, carrier 37 is in the form of an inverted stirrup with a horizontal plate 39 with a central opening 41 through which power shaft 17 extends.

The plate 39 is held in position between spaced locating collars 42 and 43. Each of such collars has a hub 44 made fast to the shaft 11 by set screws 46.

Alternately, the ground engaging wheels 34 may be replaced by a single caster wheel, not shown, arranged to be supported in such a manner as to swivel about a turning center corresponding to the longitudinal axis of the shaft 17. Such caster wheel would be mounted in a fashion that its swiveling movement would clear the blade rotor 22.

It will be seen that the ground engaging wheels 34 are held from free swiveling movement by their engagement with the ground, yet will enable the mower to be steered without lifting the wheels 34 from contact with the ground.

By reason of the placement of the wheels 34 it is possible to perform the cutting operation close to trees and shrubs. Also, by reason of such placement "scalping" of the grass at sidewalks and in uneven terrain is prevented.

Also by reason of the placement of the wheels 34, the grass is first cut by the blade rotor 22, and there is no tendency for the grass to be matted down by wheels contacting the grass in advance of the blade rotor.

While the invention has been described in terms of a preferred embodiment thereof, its scope is not intended to be limited by the precise embodiment herein shown nor otherwise than by the terms of the claim here appended.

I claim:

1. In a rotary mower, a frame having a pair of laterally spaced ground engaging wheels secured thereto, a prime mover secured to said frame and having a power shaft extending downward through said frame, a blade rotor secured to said power shaft, a shroud for enclosing said blade rotor and having a discharge opening therefrom, means for supporting said blade rotor in proper position with respect to grass being cut comprising at least one ground engaging wheel, means for mounting said ground engaging wheel for swiveling movement about said power shaft, and means including a pair of adjustable locating collars secured to said power shaft and having said ground engaging wheel mounting means therebetween, said wheel mounting means including a flat carrier with horizontally spaced vertical arms depending therefrom, each supporting a ground engaging wheel, said adjusting collars holding said flat carrier therebetween, and being movable along said power shaft to positions locating the position of said blade rotor with respect to the ground.

References Cited

UNITED STATES PATENTS

| | | | |
|---|---|---|---|
| 2,513,685 | 7/1950 | Smith et al. | 56—25.4 |
| 2,522,112 | 9/1950 | Gilmour | 56—25.4 |
| 2,545,074 | 3/1951 | Dielschneider | 56—25.4 |
| 2,669,826 | 2/1954 | Watrous | 56—25.4 |
| 2,719,396 | 10/1955 | Morris et al. | 56—25.4 |
| 2,825,196 | 3/1958 | Gudmundsen | 56—25.4 |
| 2,956,386 | 10/1960 | Niemann | 56—25.4 |
| 3,112,594 | 12/1963 | Hallenbeck | 56—25.4 |
| 3,141,283 | 7/1964 | Swindler | 56—25.4 |

RUSSELL R. KINSEY, Primary Examiner